United States Patent [19]
Griffith

[11] Patent Number: 5,580,088
[45] Date of Patent: Dec. 3, 1996

[54] MANUALLY OPERATED TRAILER HITCH WITH EXTENDABLE SWINGING BOOM

[76] Inventor: Thomas Griffith, 69 High Street, Apt. 1, Barrie, Ontario, Canada, L4L 1W5

[21] Appl. No.: 539,301

[22] Filed: Oct. 4, 1995

Related U.S. Application Data

[63] Continuation of Ser. No. 437,245, May 8, 1995, abandoned, which is a continuation of Ser. No. 134,648, Oct. 12, 1993, abandoned.

[51] Int. Cl.$^6$ ................................ B60D 1/06; B60D 1/42
[52] U.S. Cl. .................... 280/479.2; 280/478.1; 280/479.3
[58] Field of Search ............................ 280/479.2, 479.3, 280/479.1, 477, 478, 478.1, 491.1, 491.2, 491.3

[56] References Cited

U.S. PATENT DOCUMENTS

| | | | |
|---|---|---|---|
| 1,422,189 | 7/1922 | Eckertz | 280/479.2 |
| 3,093,395 | 6/1963 | Boutwell | 280/479.2 |
| 3,740,078 | 6/1973 | Murr | 280/478.1 |
| 3,753,574 | 8/1973 | Werle | 280/479.2 |
| 3,989,270 | 11/1976 | Henderson | 280/479.3 |
| 4,134,602 | 1/1979 | Boger | 280/479.2 |
| 4,773,667 | 9/1988 | Elkins | 280/479.3 |

*Primary Examiner*—Mitchell J. Hill

[57] ABSTRACT

A trailer hitch has a boom which is slideable from a drawn in position to different extended positions and which independently of its extendability is swingable from a centered position to different sideways angled hook up positions. The trailer hitch is hand operated to pull the boom inwardly from any one of the different extended positions to the drawn in position with a manual pusher for pushing the boom towards the centered position. It further includes safety stops for preventing any outward swinging of the boom while the boom is being drawn inwardly.

7 Claims, 9 Drawing Sheets

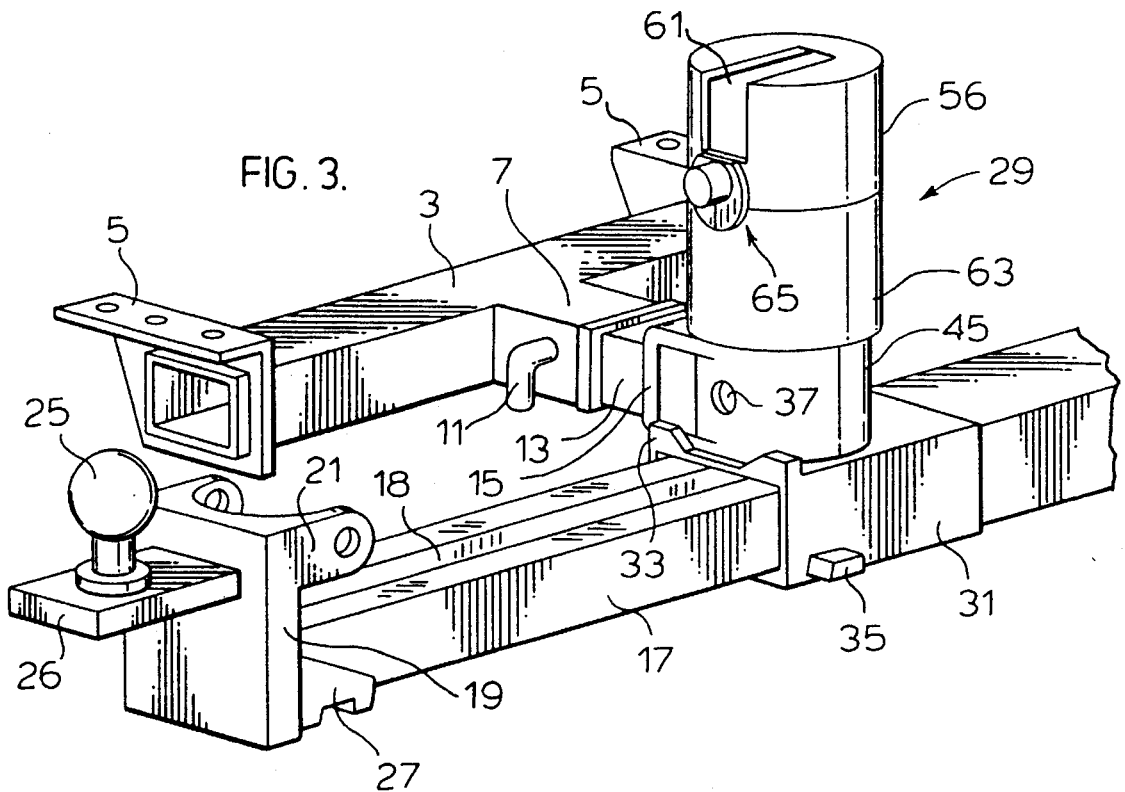
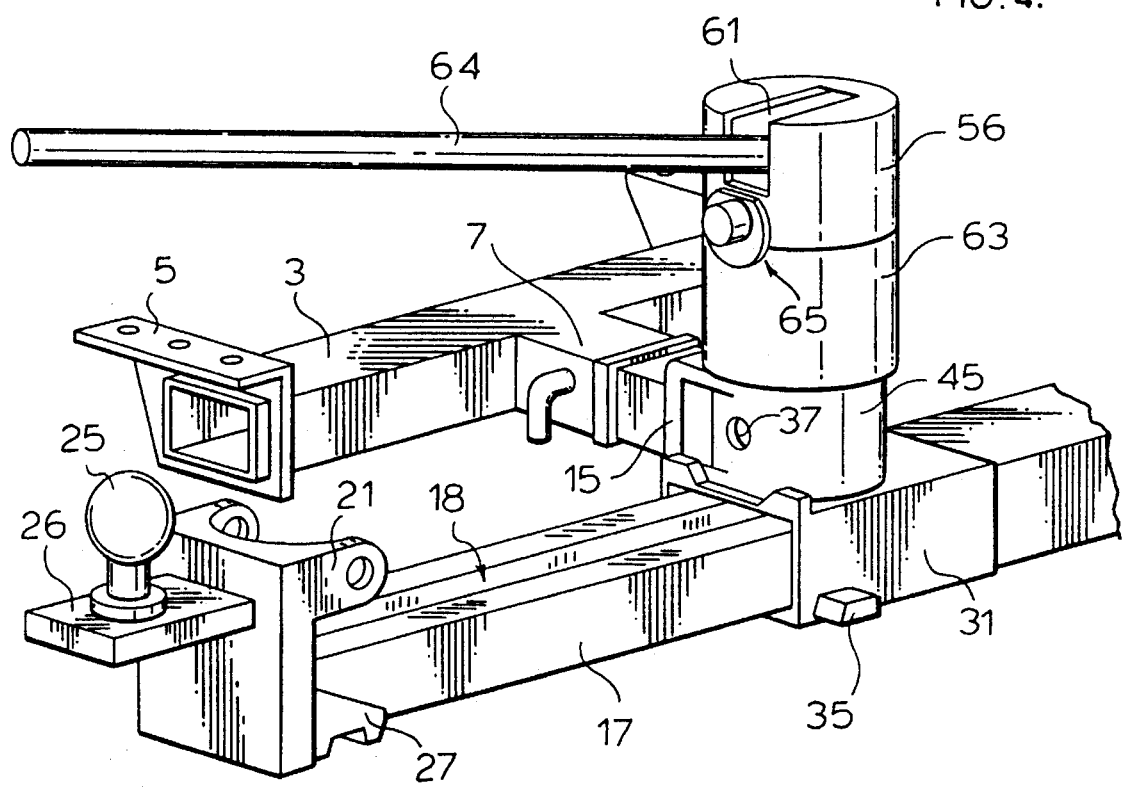

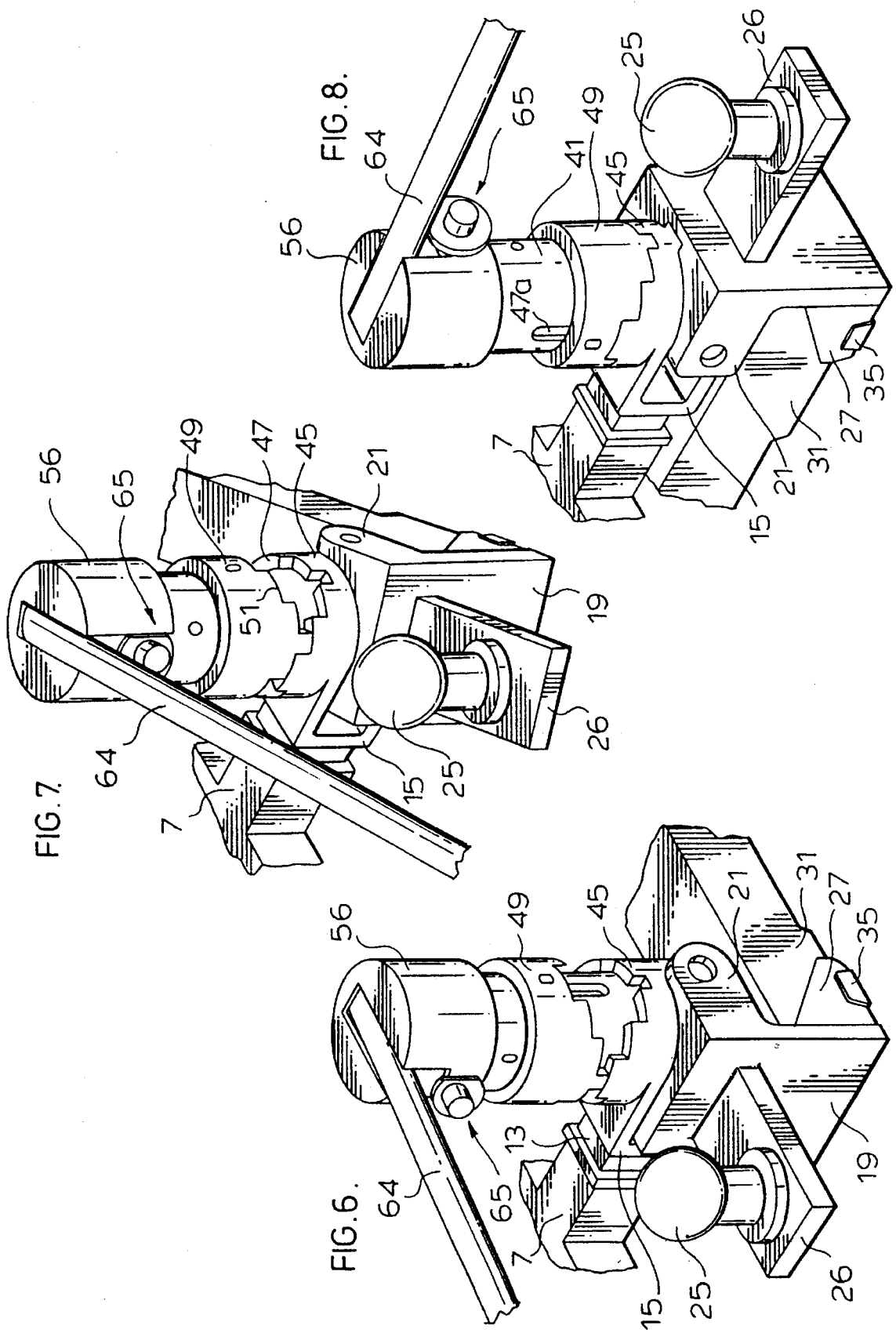

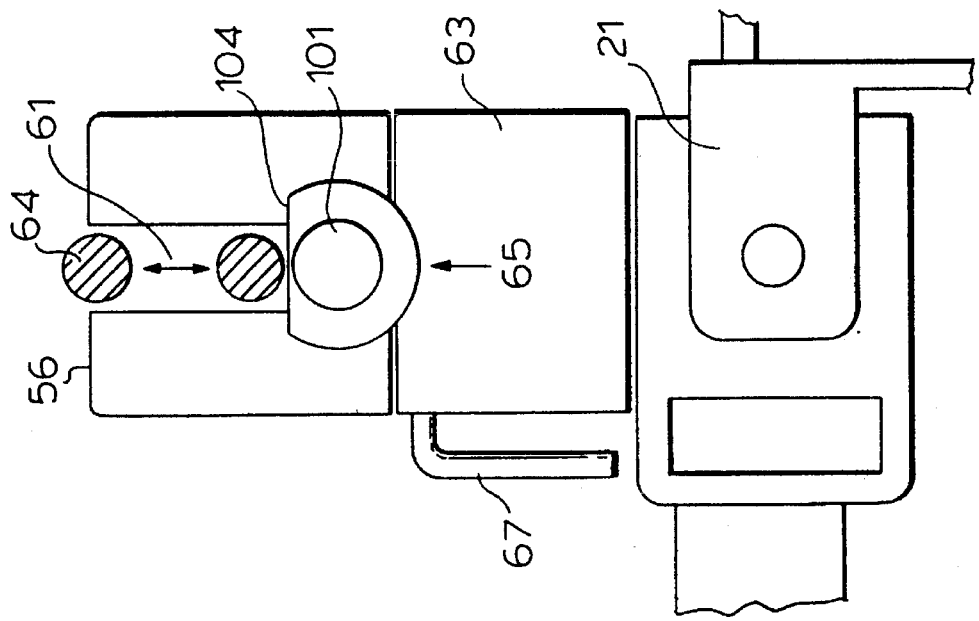
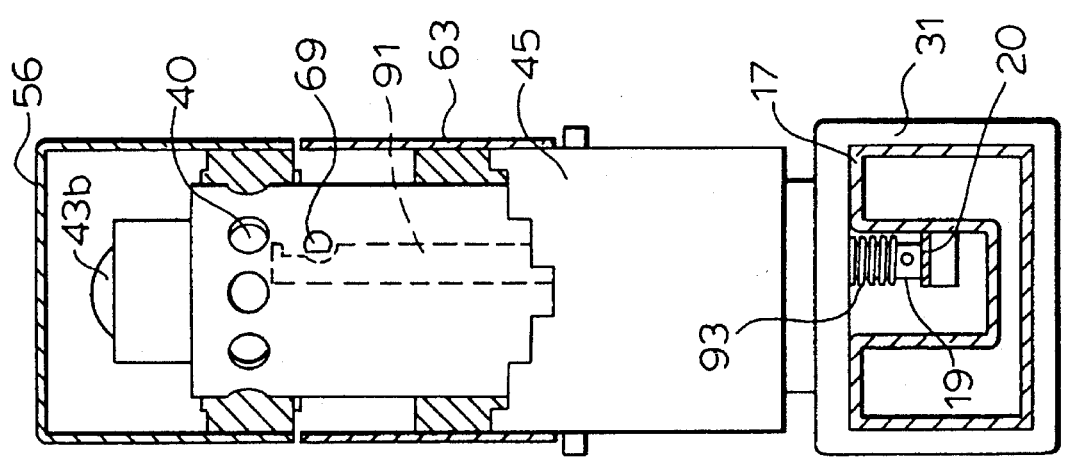
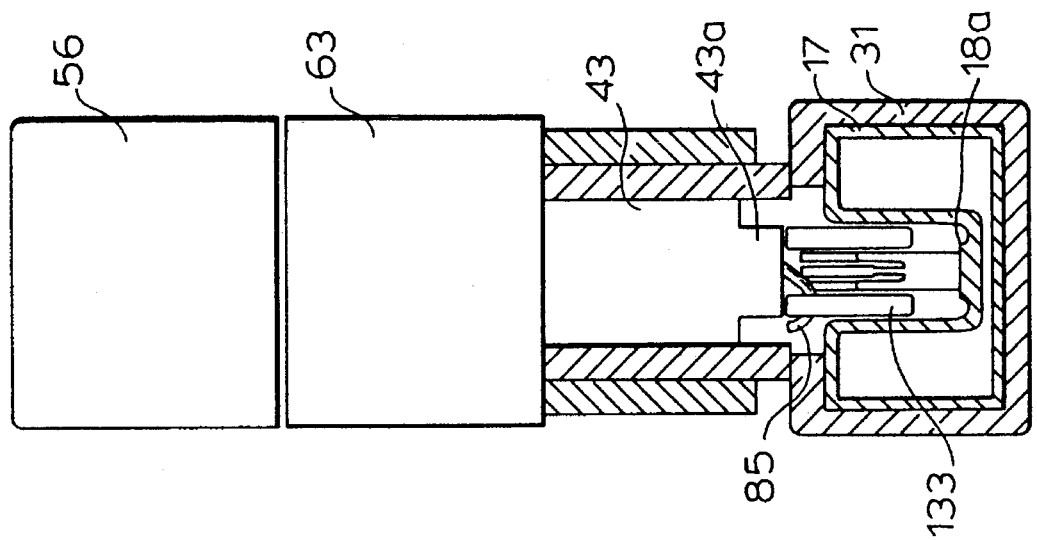

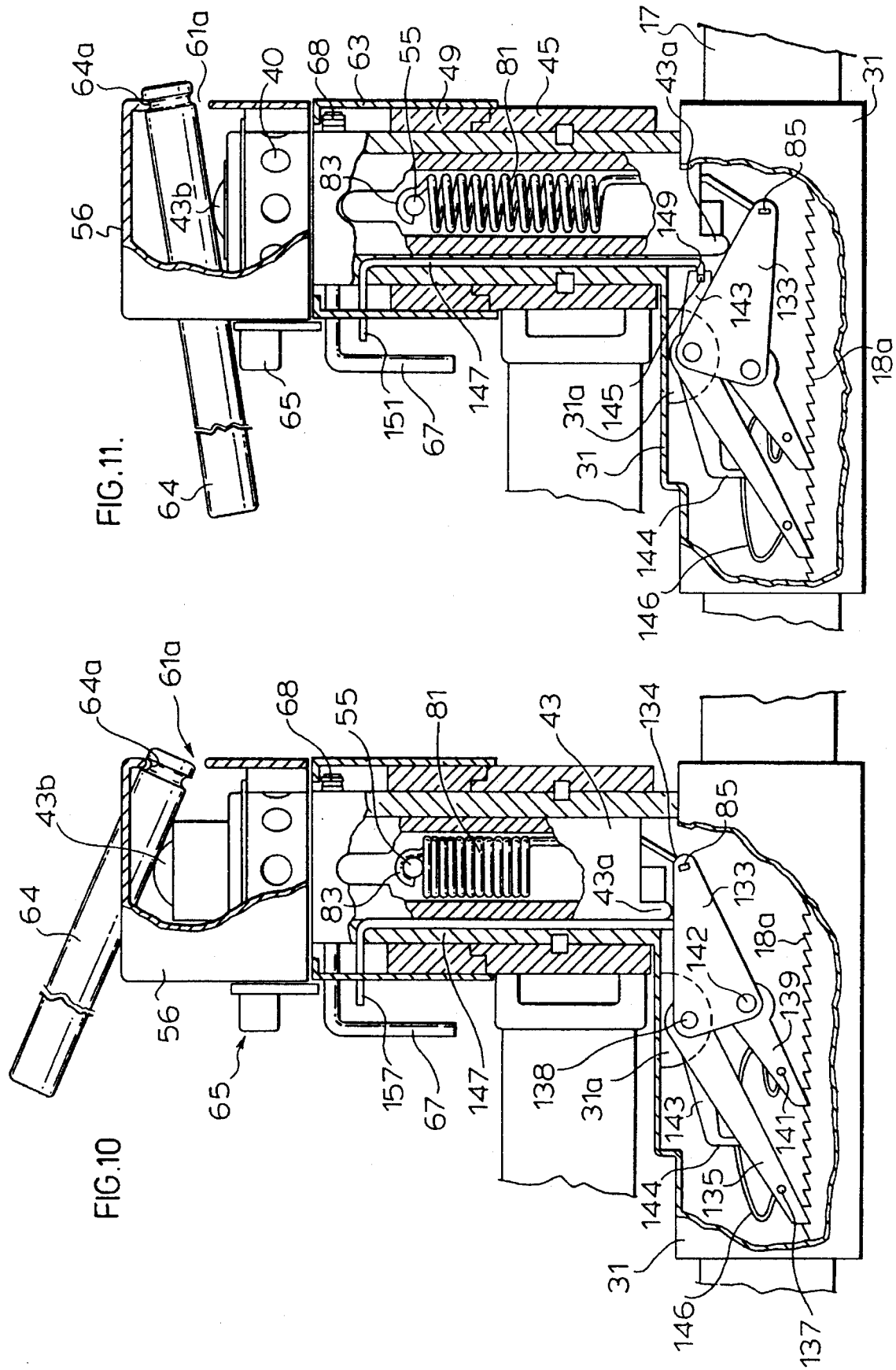

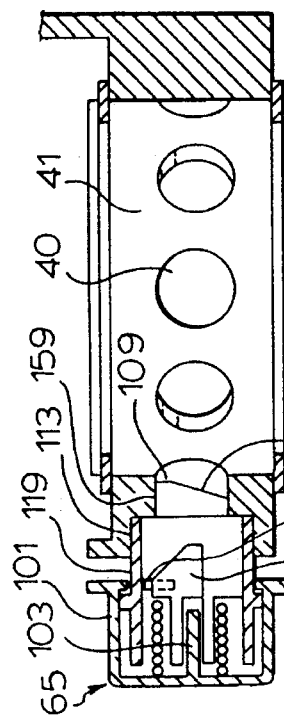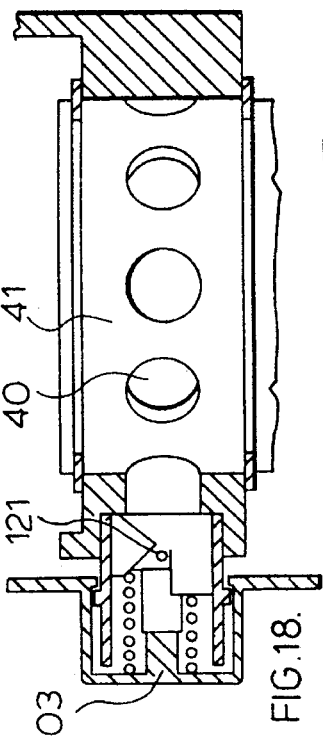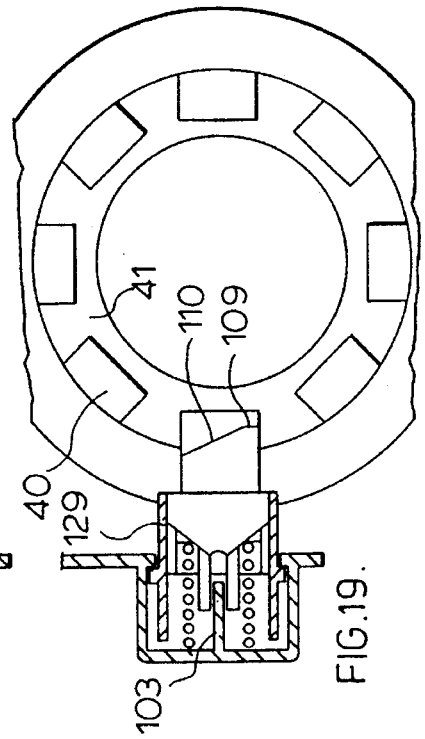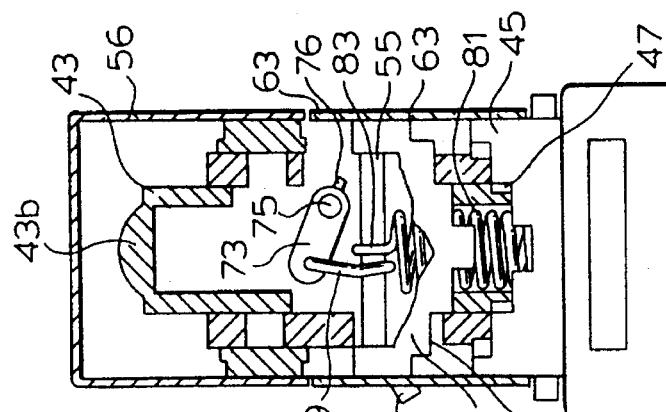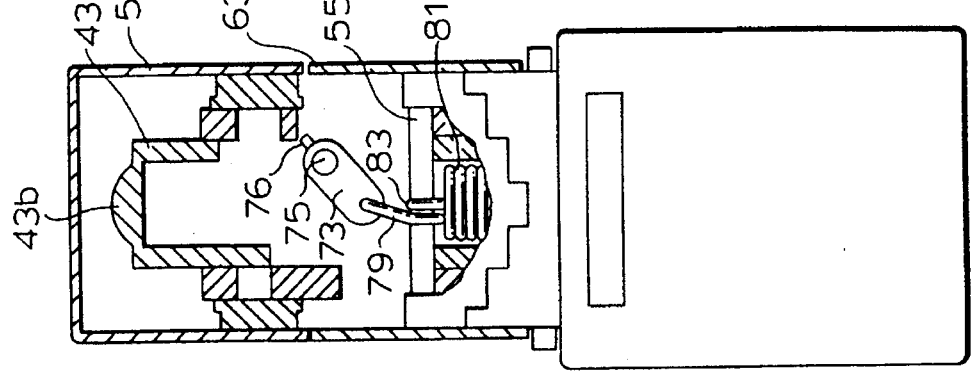

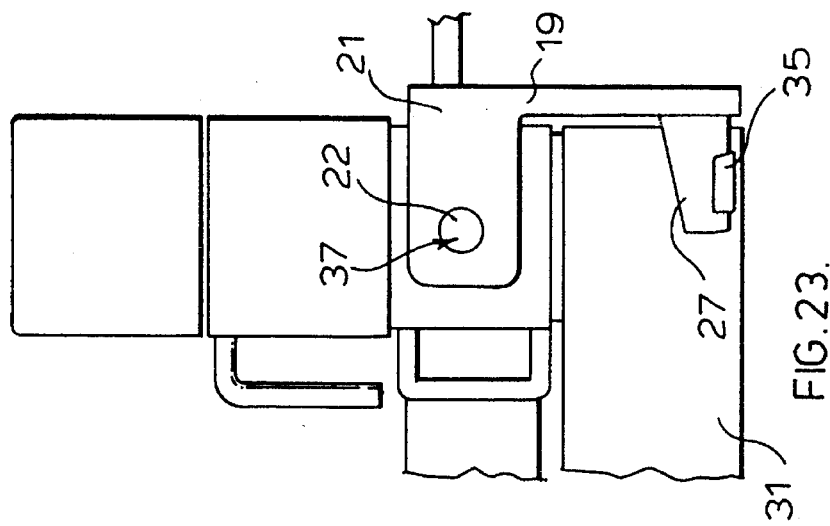
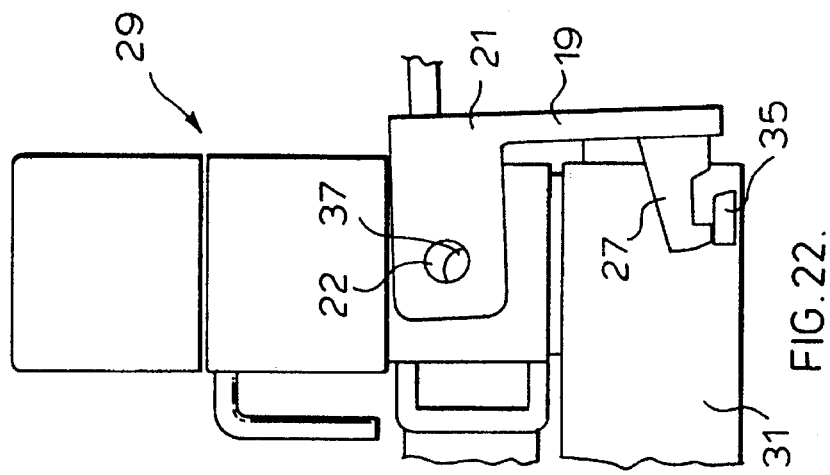
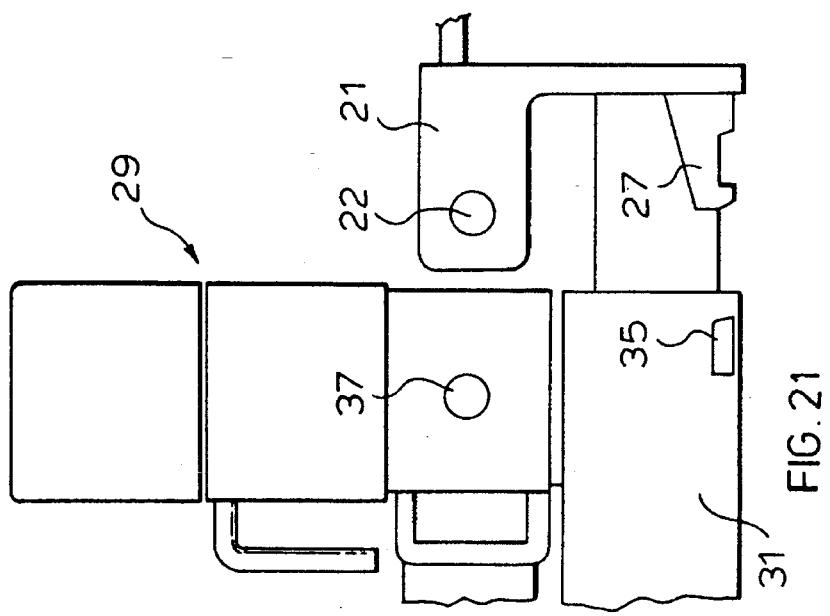

MANUALLY OPERATED TRAILER HITCH WITH EXTENDABLE SWINGING BOOM

This application is a continuation of, now abandoned, application Ser. No. 08/437,245, filed May 8, 1995 which is a continuation of abandoned application Ser. No. 08/134,648, filed Oct. 12, 1993.

FIELD OF THE INVENTION

The present invention relates to a hand operated trailer hitch with a swinging extendable boom which allows the boom to be moved to a trailer rather than having to move the trailer to the boom. The hitch further includes numerous safety features to prevent injury to the operator while manipulating the boom and attached trailer.

BACKGROUND OF THE INVENTION

The trailer hitch which is most commonly available comprises a single hitch ball secured in a fixed position to the rear of a vehicle. In order to hook up to a trailer, the trailer itself must be moved to a connecting position with the hitch ball. This can be awkward, particularly in the case of very heavy trailer, and in addition can be dangerous if the trailer is not sitting on level ground in which case the trailer may have a tendency to roll at the person who is trying to move it.

These problems associated with conventional fixed trailer balls have been appreciated and recognized by earlier inventors. For example, U.S. Pat. No. 3,126,210 to Hill describes a trailer hitch with a draw bar which is adjustable transversely and longitudinally of the hitch. However, the structure in this patent would only fit interiorly of a truck bed and even then requires modifications in the form of a specifically created opening in the rear panel of the truck bed.

According to Hill, the initial hook up of the trailer ball to the trailer is facilitated by adjusting the draw bar. From there, the draw bar and trailer are moved to the towing position by moving the truck around to reposition the draw bar. This method of connection is based on the often incorrect assumption that the trailer will react in a prescribed pattern according to the motion of the truck. However, in many cases, the trailer will roll back, forward or jump from side to side as the terrain dictates. Furthermore, on smooth ground, the friction of the mechanism in the hitch may be greater than the rolling resistance of the trailer making it very difficult to get the truck and the trailer to line up in the towing position.

U.S. Pat. No. 2,745,680 discloses a tractor hitch having a hitch bar which can be pulled rearwardly and swung sideways of the tractor to hook up to an implement to be towed by the tractor. Once again, final maneuvering to the towing position is achieved by backing the tractor up to the implement.

U.S. Pat. No. 4,773,667 discloses a trailer hitch having a boom which is both extendable and swingable to different hook up positions, however, the swing and extension movements of the hitch bar are not independent of one another because the rear end of the hitch bar is on a cam follower. This limits the number of positions to which the hitch bar can be moved because it's sideways angled position is dictated by it's extended positioning and vis-a-versa.

The interaction of the length adjustment and sideways positioning of the structure in the '667 patent may also make it difficult to manually move the trailer since the trailer has to both be moved towards center and be drawn inwardly in a single manual movement of the hitch.

U.S. Pat. No. 4,744,583 discloses a trailer hitch having a hitch bar which is both extendable and swingable relative to the hitch. As is the case with the structure in U.S. Pat. No. 4,773,667 the swinging and extension motions are tied in with one another. Therefore, once again, the structure in the '583 patent suffers from the drawback that the hitch bar can only be moved to a relatively limited number of positions. It does not however suffer the difficulties associated with drawing the trailer into the towing position because the hitch in the '583 patent is motorized. On the other hand, a motorized tow hitch is substantially more costly than a manually operated hitch.

SUMMARY OF THE INVENTION

The present invention provides a manually operated trailer hitch specifically designed to overcome the drawbacks associated with prior art trailer hitches such as those disclosed above. In addition, the trailer hitch of the present invention is designed with numerous different features to ensure operator safety.

More particularly, the trailer hitch of the present invention has a boom which is slideable from a drawn in position to different extended positions and which is swingable from a centered position to different sideways angled hook up positions. The extendability and swingability of the boom are totally independent of one another.

The trailer hitch includes hand operated mechanical means for pulling the boom inwardly from any one of the different extended positions to the drawn in position. It also includes a manual pusher for pushing the boom towards the centered position with stop means for preventing outward swinging of the boom while it is being drawn inwardly so that the trailer cannot roll sideways and trap the operator between the trailer and the rear of the vehicle to which the hitch is secured.

Numerous other safety features are also provided on the trailer hitch according to different aspects of the present invention.

BRIEF DESCRIPTION OF THE DRAWINGS

The above as well as other advantages and features of the present invention will be disclosed in greater detail according to the preferred embodiments of the present invention in which;

FIG. 3 is a further perspective view of the trailer hitch of FIG. 1 with the boom extended outwardly and swung to a sideways angled position;

FIG. 4 is a perspective view similar to FIG. 3 including a hand operated lever for both drawing the boom inwardly and for pushing the boom back to the centered position;

FIGS. 6, 7 and 8 are perspective views of the trailer hitch with the exterior casing removed to show operation of the center column construction.

FIG. 9 is a partially sectioned end view of the trailer hitch of FIG. 1.

FIGS. 10 and 11 are partially sectioned side views showing different operating positions of the trailer hitch of FIG. 1.

FIG. 12 is a sectional view through the trailer hitch of FIG. 1.

FIGS. 15 and 16 are end views showing the center column assembly in section from the trailer hitch of FIG. 1.

FIGS. 17 and 18 are enlarged perspective views of an internal ratchet assembly from the center column assembly of FIG. 1.

FIG. 19 is a top view of the ratchet assembly shown in FIGS. 17 and 18.

FIG. 20, appearing on the same page of drawings as FIGS. 9 and 12, is a side view of the center column assembly of the trailer hitch of FIG. 1.

FIGS. 21 through 23 are side views showing different boom extension positions of the trailer hitch.

DETAILED DESCRIPTION ACCORDING TO THE PREFERRED EMBODIMENTS OF THE PRESENT INVENTION

Figure 1:
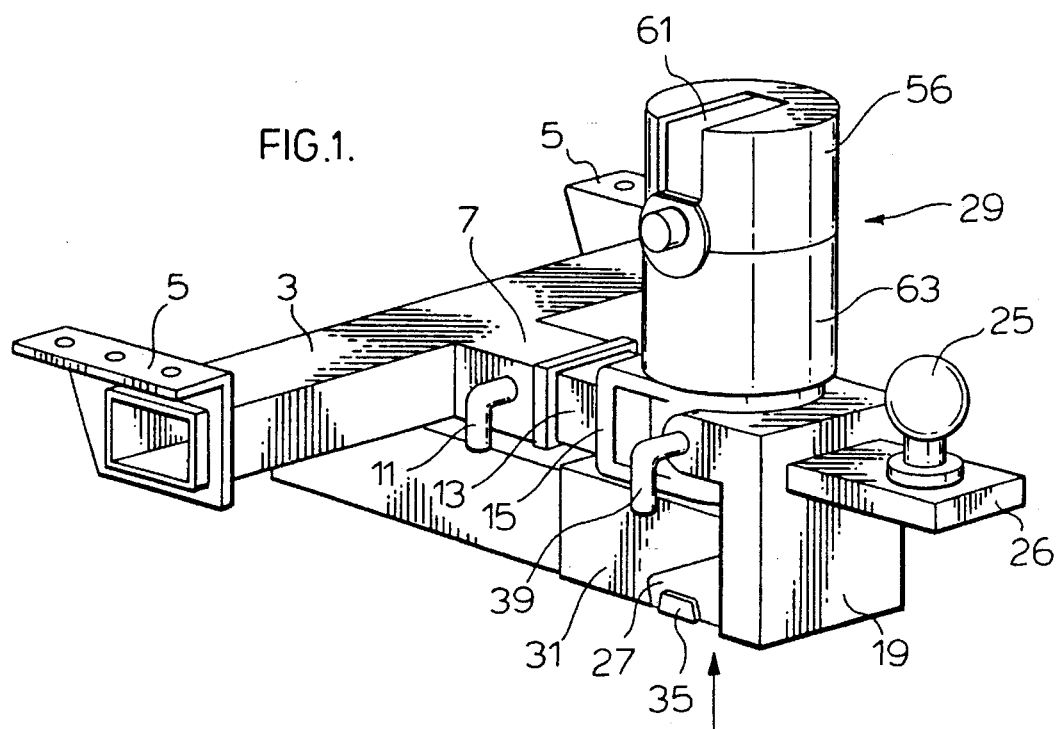
FIG. 1 is a perspective view of a trailer hitch in the towing position according to a preferred embodiment of the present invention.
Figure 2:
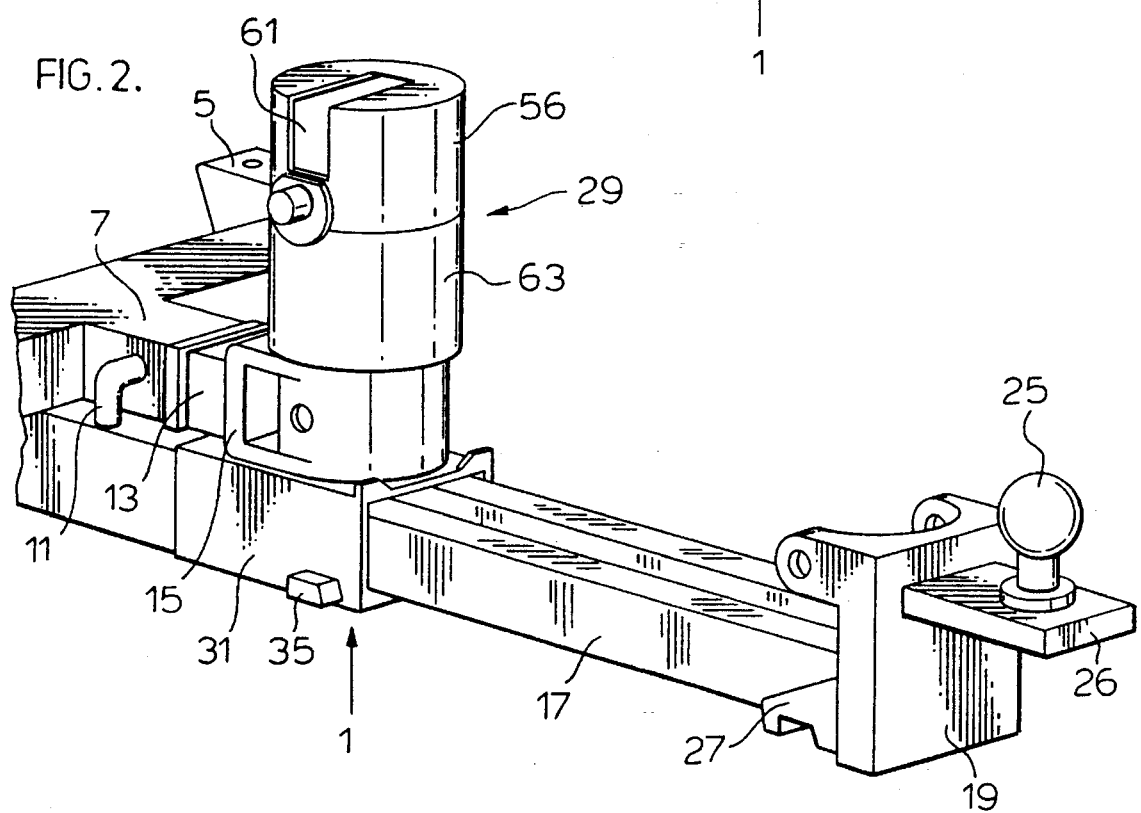
FIG. 2 is a further perspective view of the trailer hitch of FIG. 1 with the boom extended outwardly in a centered position.

FIGS. 1 through 3 show a trailer hitch generally indicated at 1. This hitch includes square shank or arm 13 which fits into a hollow collar 7 of a standard base or attachment piece 3 having opposite side flanges 5 which secure to a vehicle to receive the hitch. Hitch 1 is quickly and easily connected and disconnected to the more permanent base of the hitch by means of a coupling pin 11.

The forward end of arm 13 of the hitch includes a C-shaped bracket portion 15 to which is secured a center column assembly 29 of the hitch. The construction of the center column assembly is well shown in FIG. 5 of the drawings and will be described later in detail.

An open ended sleeve 31 is provided at the bottom end of the center column assembly. A hitch boom 17 is slideably fitted within sleeve 31. This hitch boom includes a longitudinal slot 18 on its upper side which opens down into the boom exposing ratchet teeth 18a running lengthwise of the boom and again to be described later in detail.

A pair of stops 33 are provided to either side atop sleeve 31. The sleeve along with much of the center column assembly is rotatable relative to support bracket 15. The boom carried within sleeve 31 will continue to turn or rotate sideways until the appropriate stop 33, i.e. depending upon the direction in which the boom is rotated moves up against the outside edge of bracket 15 thereby determining the maximum angle of rotation for the boom.

Provided near the lower edge of sleeve 31 on opposite sides of the sleeve are a pair of catches 35 only one of which can be seen in the drawings. These catches cooperate with hooks 27 provided near the outer end of the boom to assist in holding the boom to align the outer end of the boom with the center column and to also assist in holding the boom in the towing position.

A trailer ball mounting yoke 19 is secured to the outer end of boom 17. Yoke 19 includes a horizontally extending tongue or flange 26 which removably receives trailer ball 25.

The trailer ball in the embodiment as shown includes a lower threaded stem secured by a nut through flange 26.

Provided on opposite sides of hitch ball mounting yoke 19 are a pair of arms 21. These arms wrap around the center column of the trailer hitch when the hitch ball is brought into the retracted towing position as shown in FIG. 1 of the drawings. The center column is provided with a series of openings through the lower end of the center column which line up with openings 22 in arms 21 to receive a reinforced pin 39 to positively secure the hitch in the towing position.

Figure 5:
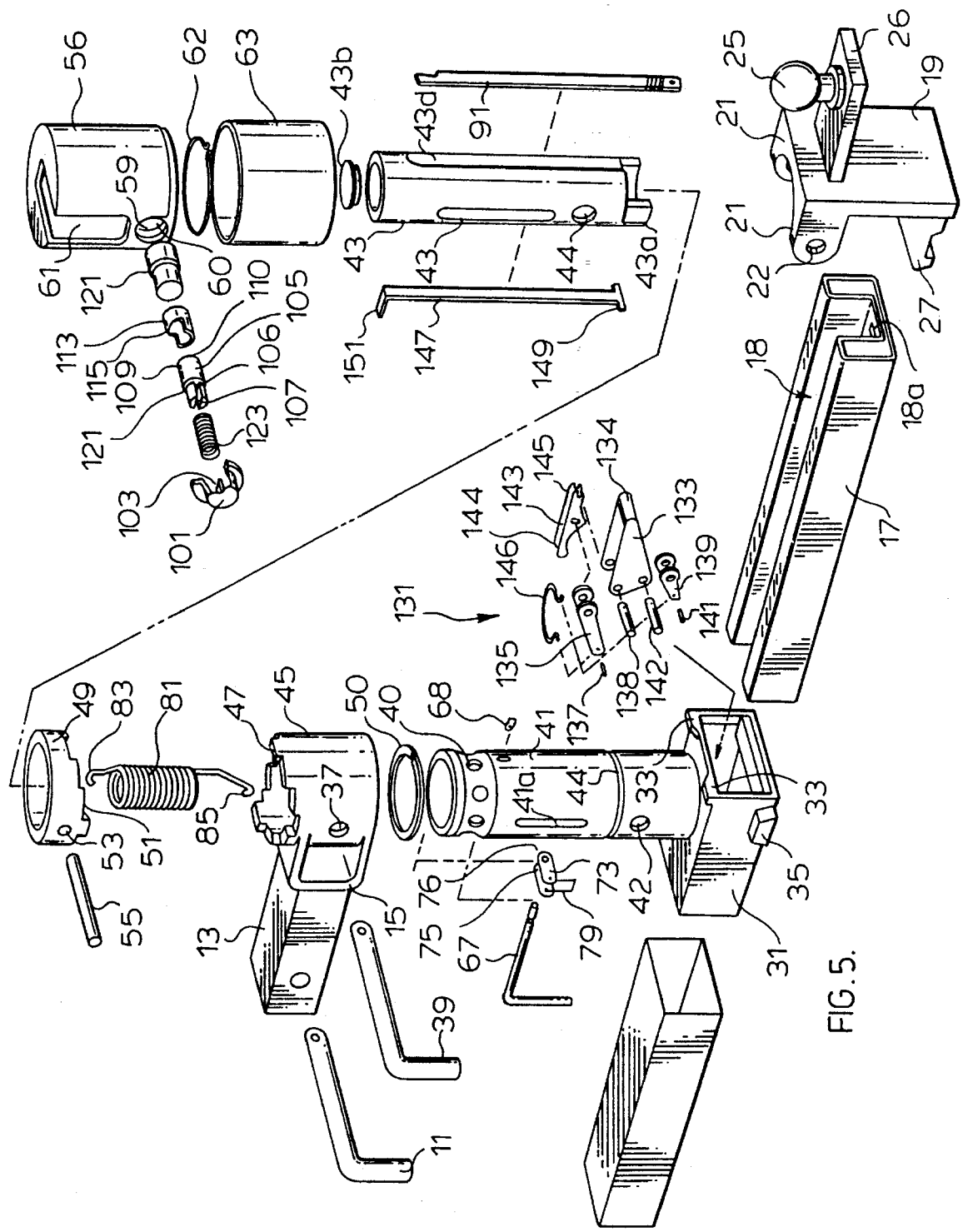
FIG. 5 is an exploded perspective view of the trailer hitch of FIGS. 1 through 4.

The construction of the center column assembly is now described having reference to FIG. 5 of the drawings.

Extending upwardly from sleeve 31 is a hollow shaft member 41 which is welded to the sleeve. A ratchet shaft 43 fits into shaft 41. The upper rounded cap 43b of the ratchet shaft extends above the hollow shaft 41. A collar 45 having an upper stepped surface 47 slides downwardly over the shaft 41 and seats on sleeve 31. As shown, collar 45 is an integral part of bracket 15 and this bracket as earlier disclosed forms part of connector arm 13 so that collar 45 does not rotate but rather remains in a held position relative to the base of the trailer hitch.

Openings 37 are provided on either side of collar 45. Hollow shaft 41 includes openings 42 while ratchet shaft 43 includes openings 44. The openings 37, 42 and 44 all align with one another when the boom is in its towing position to co-operate in locking with openings 22 in arms 21 as earlier described.

A further collar 49 also slides downwardly over shaft 41 and this collar includes a bottom stepped surface 51 which sits atop the upper stepped surface 47 on collar 45. These two stepped surfaces cooperate with one another to provide a rotation control safety feature for the hitch.

Collar 49 is provided with small openings 53 to either side of the collar, and a pin 55 seats in the two small openings 53 extending across the collar. This pin fits through the elongated vertical slots 41a and 43c respectively of shafts 41 and 43 which allows vertical movement of collar 49 relative to the two shafts and which also rotationally couples the shafts and the upper collar with one another.

Shaft 41 includes a slot 44 which receives a split ring 50. This split ring locks interiorly of collar 45 when the collar is fitted onto shaft 41 allowing shaft 41 to rotate relative to collar 45 without the collar sliding upwardly from the shaft.

The upper part of collar 45 above bracket 15 is covered by a sleeve 63. The upper collar 49 slides down interiorly of and is completely covered by sleeve 63. As later described, unlike lower collar 45, upper collar 49 is rotatable on shaft 41.

An upper cap 56 completes the upper end of the center column construction. This cap seats directly on top of the upper end of shaft 41 and is secured to the shaft by a pair of locking clips 62 only one of which is shown in FIG. 5. The downwardly depending collar portion of cap 56 includes an opening 59 which in different rotational positions of the upper cap aligns with one of the openings 40 around the upper end of shaft 41. A lever socket ratchet assembly generally indicated at 65 fits through opening 59 to fit in a selected one of the openings 40 depending upon the angle to which the boom has been rotated.

Cap 56 includes an elongated opening 61 as shown. A lever bar 64 shown in FIGS. 4 and 6 through 8 is removably insertable into slot 61. The upper end cap 43b of ratchet shaft 43 is engaged by lever bar 64 for ratcheting the tow bar inwardly.

The combination of the upper collar 49 and the lower collar 45 provide what is referred to as a centralizing ratchet. A lever 67 is provided for operating the centralizing ratchet. The lever fits into the center column structure through an arm assembly generally indicated at 71 comprising a pair of side plates 73 with aligned openings and a small hollow tubular piece 75 fitted between the aligned openings of the side plates. A small wire loop 79 is pivotally secured between the side plates as shown.

When the center column structure is assembled as shown, for example, in FIG. 13, arm assembly 71 is suspended on lever 67 internally of and slightly below the upper end of shaft 43. The small wire loop 79 of the arm assembly 71 fits around pin 55 secured in the upper cradle 49.

As seen in FIGS. 10 and 11 of the drawings, a spring 81 includes a hooked upper end 83 which wraps around pin 55 of upper collar 49. The spring also includes a lower end 85 which is connected to a pawl assembly which will be later described in detail. Also shown in FIGS. 10 and 11 is the feature that spring 81 through its upper end connection to pin 55 pulls upper collar 49 downwardly against lower collar 45. FIGS. 10 and 11 show the lowest position of the upper collar where the lower stepped edge 51 of the upper collar meshes or mates exactly with the upper stepped edge 47 on the lower collar. When the two collars are completely mated with one another, the boom is in its centered position.

Movement of the boom through its centralizing ratchet arrangement is described in reference to FIGS. 6, 7 and 8 of the drawings.

FIG. 6 shows the boom in its most sideways angled position, i.e. 90 degrees from its centered position. As will be understood, the boom is also swingable 180 degrees from the FIG. 6 position.

The boom is not normally allowed to the FIG. 6 position because of the spring biased meshing of the two collars 45 and 49. However, the upper collar can be pulled upwardly against the pressure of spring 81 through the use of lever 67. This lever is rotationally coupled to the arm assembly 71 by means of the set screw 76 threaded through collar 75 and biting onto the lever. Therefore, upper rotation of the lever 67 causes the arm assembly to pivot or turn upwardly at its outer end to which wire 79 is fitted which in turn pulls upwardly on the pin 55 to lift the upper collar. Once the teeth on the lower edge of the upper collar have completely cleared the teeth on the upper edge of the lower collar, the upper collar along with the boom shaft 41 which is rotationally coupled with the upper collar can be swung sideways away from the center position.

As soon as lever 67 is released, it is turned downward by a spring 68 seen, for example, in FIG. 10 of the drawings. Therefore, arm assembly 71 is automatically pulled back downwardly and the upper collar is pulled down by spring 81. The degree to which it meshes with the lower collar is strictly a function of how far the boom has been rotated. In FIG. 6, it will be seen that the deepest tooth on the lower edge of the upper collar seats on the largest tooth on the upper edge of the lower collar. This is the most sideways angled position of the boom. This particular tooth-to-tooth contact is balanced on both sides of the center column which cannot be seen in FIG. 6. As earlier noted, the boom cannot be swung beyond the FIG. 6 position because of the limit stops provided on the boom sleeve.

Lever 64 has two functions. Firstly, it is moved in an up and down direction for inward ratcheting of the boom. In addition, it is used as a push bar for manually pushing the boom to which the trailer is fitted back to its centered position. The operator may be positioned between the boom and the rear of the vehicle and therefore it is important that the boom not be allowed to inadvertently swing back towards the vehicle once drawing in of the boom has begun. This is controlled by the stepped teeth on the two collars in combination with the downward spring bias on the upper collar. As will be seen in comparing FIGS. 6 and 7, as soon as the boom has been pushed to the FIG. 7 position, the upper collar is immediately pulled one notch down farther relative to the lower collar which prevents the boom from swinging back to the FIG. 6 position. The downward stepping of the upper collar continues as it is rotated towards center and with each centering step the upper collar is prevented from rotating back in the direction from which it has been pushed. The centering of the boom is continued until the upper collar reaches its centered position as shown in FIG. 8 of the drawings.

Generally speaking the best mode of operating the hitch is to first draw the boom inwardly and then, when there is less leverage on the boom, to push the boom to center. Both operations are performed using lever 64 but in independent motions.

Figure 14A:
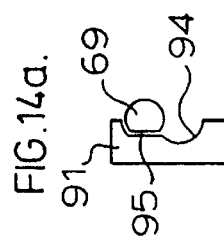
FIG. 14a is an enlarged sectional view of the circled area indicated in FIG. 14.

It is important that one does not inadvertently release the centralizing ratchet as the boom is being drawn in. Accordingly, a specific safety feature is provided to prevent lifting of the upper collar other than when the boom is in the fully drawn in position. This safety feature is best described having reference to FIGS. 13, 14, and 14*a* of the drawings.

Figure 14:
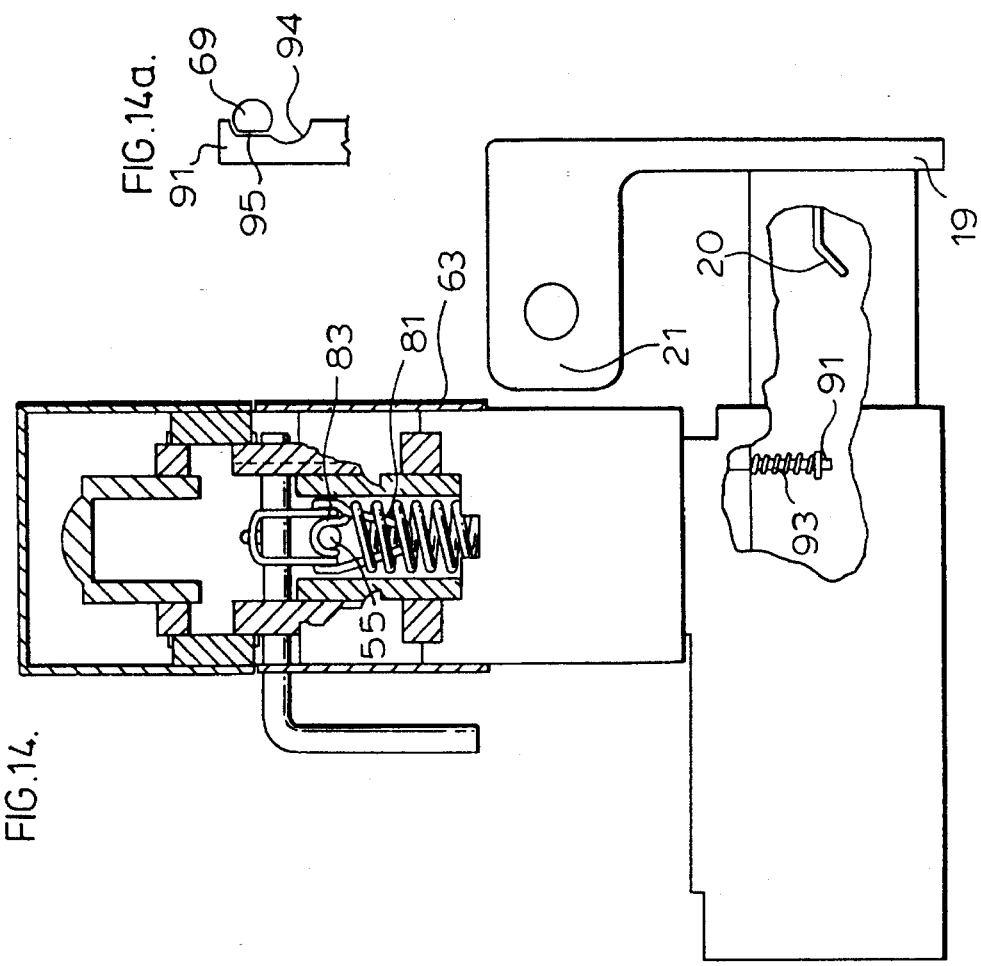
FIGS. 13 and 14 are partially sectioned side view of the trailer hitch of FIG. 1.

More particularly, the boom yoke 19 is provided with a forwardly extending tongue 20 which has a cammed outer end as shown. Provided interiorly of the center column is an elongated rod 91 which is axially slideable within a slot 43*d* along the side of shaft 43 interiorly of the column. Rod 91 is normally biased to a down position as shown in FIG. 14 by a spring 93.

The upper end of rod 91 has a pair of recessed regions including a first semi-circular recess 94 and a second flat sided recess 95. As best seen in FIG. 14(*a*) of the drawings, recess 94 is located beneath recess 95. Also shown in FIG. 14(*a*) of the drawings, is the fact that the outer end 69 of lever 67 is semi-circular in configuration and also includes a flat side.

Figure 13:
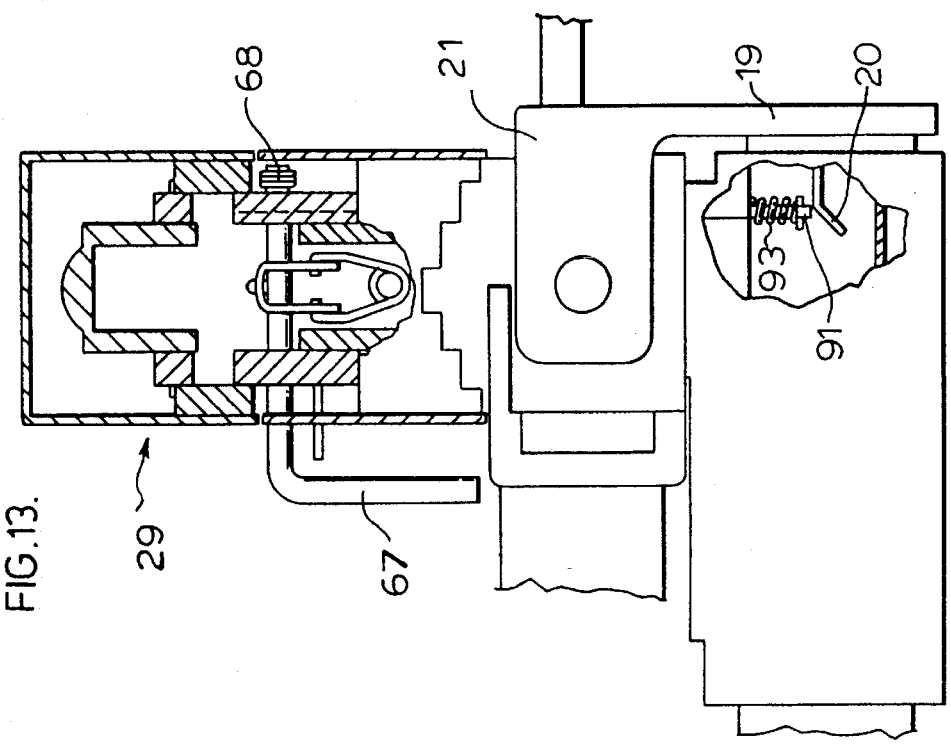

When the boom is in its fully retracted position, as shown in FIG. 13, arm 20 on the boom yoke pushes rod 91 upwardly against the pressure of spring 93. In this position, the semi-circular recess 94 on the rod lines up with the end 69 of lever 67. This positioning of the rod relative to the lever end allows the lever to be turned to raise the upper collar 49 as earlier described. This in turn allows the boom to be swung to the desired angle for lining up with the trailer. AS soon as the boom is pulled outwardly from the towing position, tongue 20 moves away from its position beneath rod 91. The rod is then pushed downwardly by spring 93 such that the flat recess 95 on the upper end of rod 91 aligns with the end of the lever. The boom can continue to be swung outwardly as long as lever 67 is held or turned upwardly. However, once the lever is released it is automatically turned downwardly under the pressure of spring 68 where the flat on the lever end 69 aligns with the flat in the recess 95 at the upper end of rod 91. In this particular positioning of components as shown in FIG. 14(*a*) of the drawings, the lever cannot be turned back upwardly to release the centralizing ratchet assembly thereby preventing outward swinging of the boom.

If one does wish to re-lift lever 67 to release the centralizing ratchet the boom must once again be pulled into its fully drawn in position raising rod 91. In this drawn in position of the boom it presents no hazard to the safety of the operator.

As earlier noted, lever 64 has two functions, i.e. to ratchet in the boom and to push the boom to center. A further safety feature is provided in the hitch which, if used properly, prevents the lever itself from swinging inwardly with the boom which might otherwise result in the operator's hand being pinched between the lever and the back of the vehicle to which the hitch is attached. This safety feature is best described having reference to FIGS. 5 and 17 through 19..

As described, many of the components in the center column construction rotate with the swinging of the boom. One of these components is the upper cap 56 in which the lever is fitted. If the boom is being pushed as opposed to pulled towards center, then the lever will be moving towards the back of the vehicle to which the hitch is attached creating a potential hand pinch problem, i.e. the boom swinging to center could carry the lever with the weight of the trailer directly into the bumper. However, this potential problem is eliminated through the use of a lever socket ratchet assembly which positively couples the lever socket with the center column in one direction and which causes the lever socket to be rotationally released from the center column assembly in the opposite direction. Furthermore, the lever socket ratchet assembly can be reversed in its locking direction on the center column assembly and can even be put to a neutral or free-wheeling position on the center column assembly.

More particularly, the lever socket ratchet assembly generally indicated at 65 fits through opening 59 in the lower collar 57 of the upper cap 56. The hole 59 in collar 57 is at the same height as the holes 40 around the upper end of boom shaft 41.

The ratchet assembly 65 comprises an exterior cap or handle 101 having an inner tongue 103. This tongue fits into a groove 107 at the rear end of a pin 105. Pin 105 has a forward tooth 109 having a right angled rear surface and a sloped forward surface 110. The pin is also provided with a small upstanding tit 121.

Pin 105 fits within a cut collar 113 having a center semi-circular notch 115 and forward cut away regions 117 to opposite sides of the central notch. The cut collar 113 fits internally of a further extended collar 119. This extended collar includes a ridge 121 running externally around the extended collar onto which cap 101 locks as seen in FIGS. 18–20. The inner end of the extended collar abuts with stop 60 in the opening 59 of cap 56.

A spring 123 is trapped between the exterior cap 101 and lip 106 at the rear end of pin 105.

The forward end of pin 105 fits completely through opening 59 in the upper cap 56 and reaches to the openings 40 in the upper end of boom shaft 41. Spring 123 pushes forwardly on the pin so that it wants to engage in the particular boom shaft opening 40 aligned with opening 59 in the upper cap. However, if pin 105 is rotated by means of cap 101 to a position where tit 121 is engaged within the semi-circular recess 115 of the cut collar 113, then the pin 105 is prevented from driving forward into the upper end of the boom shaft as shown in FIG. 17 of the drawings. In this position, the cap 56 and lever 64 fitted in the cap are completely free-wheeling relative to the boom shaft and the remainder of the center column.

By rotating the pin 105 in either direction away from the free-wheeling position, tit 121 will jump out of recess 115 and ride downwardly and forwardly into one of the forward cut recesses 117 of collar 113. This places the pin tooth 109 into the boom shaft opening 40 aligned with cap opening 59. The right angled rear face of the tooth sits in the boom shaft opening such that the cap 56 is now rotationally coupled with the boom shaft in one direction. However, as can be clearly seen in FIG. 19 of the drawings, the forward cammed 110 of the tooth 105 will cause the tooth to slide out of the opening 40 if the cap 56 is rotated in the opposite direction.

The above feature allows one to push the boom using lever 64 to the centered position while allowing cap 56 and the lever 64 fitted in the cap to slip in the opposite direction eliminating the possibility of one's hands being trapped under pressure between the lever and the back of automobile as the boom moves under its own momentum to center.

As earlier described, collar 113 includes the forwardly cut recesses 117 to opposite sides of the center notch 115 so that pin 105 can be turned in both directions away from center making the lever socket ratchet assembly reversible in its direction of operation.

When lever 64 is operated in a ratchet as opposed to a pusher mode, it is best to have the lever socket ratchet assembly 65 in the free-wheel position so that one can easily rotate the lever to the most efficient operating angle for ratcheting the boom in. In addition, for safety purposes, it is best not to have the lever rotationally coupled to the boom while performing the ratchet operation. Accordingly, the exterior cap 101 for the lever socket ratchet assembly is as best shown in FIG. 25 provided with a flat 104. The exterior cap itself is in-line with the upper cap slot 61 in which the lever bar 64 moves up and down in the ratcheting motion. The lever bar can only be pushed down to the ratchet engaged position if the flat on the exterior cap is up where the pin 105 is in the centered position and the cap is freely rotational on shaft 41. If, however, cap 101 is turned to either side of center, the cap will interfere with downward movement of the lever bar necessitating movement of the cap to the center position before the boom can be ratcheted in. As earlier noted, this centered position is represented by FIG. 17 where the center column cap 56 is in its free-wheeling position where it is allowed to turn without restriction in either direction relative to boom shaft 41.

The ratchet operation of the boom, i.e. the pulling in of the boom, will now be described having reference to FIGS. 5, 10 and 11 of the drawings.

As seen in FIG. 5, a pawl assembly generally indicated at 131 is provided within the boom sleeve for moving the boom. This pawl assembly is operated by means of a bottom extension 43a of shaft 43 as seen in FIG. 5 of the drawings.

Shaft 43 as earlier described also includes a dome like upper cap 43b providing a contact surface for pushing the vertically movable shaft 43 downwardly with the operation of lever 64 as shown in FIG. 11 of the drawings.

Returning to FIG. 5, pawl assembly 131 comprises a pawl mount 133 having opposite side plates to receive first and second pawls 135 and 139. The pawl 135 is rotationally coupled to the pawl mount by means of a pin 138 and the pawl 139 is rotationally coupled to the pawl mount by means of a a pin 142. Pawl mount 133 is rotationally attached to the upper inside surface of sleeve 31 by means of pawl mount support 31a and pin 138. Pawl mount 133 has a spring receiver recess 134 at its rear end.

A moveable pawl control 143 is also pivotally secured to pawl mount 133 by means of pin 138. Pawl control 143 has a U-shaped recess 145 at its rear end. The front end of pawl control 143 is attached to pawl control spring 146. The forward end of pawl control spring 146 is pivotally attached to the forward end of pawl 135 by means of pin 137. The rearward end of pawl control spring 146 is pivotally attached to the forward end of pawl 139 by means of pin 141.

As described above, shaft 43 is vertically slideable within the center column assembly. The lower extension 43a of the shaft rides on the pawl mount as shown in FIGS. 10 and 11 of the drawings. The pawl mount is normally biased to the FIG. 10 position by spring 81 which secures in recess 134 at the end of the pawl mount. Accordingly, the pawl mount, when in the FIG. 10 position holds the shaft 43 in a relatively raised position.

Lever 64 is used to push shaft 43 downwardly as shown in FIG. 11 of the drawings. Shaft 43 includes elongated slots 43c which enable vertical movement of the shaft relative to the collar pin 55. When shaft 43 is pushed downwardly by lever 64 the pawl mount rotates relative to pawl mount support 31a of sleeve 31 as seen in FIGS. 10 and 11 so that the back end of the pawl mount moves down to the FIG. 11 position which extends spring 81. As soon as the lever is released, the spring through its connection to the pawl mount pulls shaft 43 back upwardly.

A vertically movable pawl control bar 147 is provided for adjusting the relative positions of the two sets of pawls 135 and 139. This pawl control bar includes a lower T-shaped end 149 which fits into the recess 145 of the pawl control member 143. The pawl control bar also includes an L-shaped upper end 151 which extends externally of the center column assembly for adjusting the vertical position of the pawl control bar which in turn adjusts the position of pawl control member 143

If the pawl control bar is moved to its most elevated position control member 143 pivots such that the forward end 144 pushes pawl control spring 146 downward biasing pawls 135 and 139 against ratchet rack 18a. The pawl control bar can also be moved to a center position which raises the forward end of the pawl control 143 upwardly, relieving the pawl control spring of any bias, upwardly or downwardly. The pawl control bar can be moved to it's lowest setting which further raises the pawl control spring 146, lifting pawls 135 and 139 completely off ratchet rack 18a. When the pawl control bar 147 is in its most elevated position, as shown in FIG. 10 and 11, the two pawls are engaged with ratchet rack 18a to pull the boom inwardly with the up and down movement of lever 64.

The lower, shorter pawl 139 acts as a primary pawl and the longer upper pawl 135 acts as a secondary pawl. As shaft 43 is pushed downwardly by lever 64, the primary pawl pushes on the rack teeth, driving the rack forward. The secondary pawl 135 is forced upward against the spring bias of pawl control spring 146 as the rack moves forwardly. When the rack 18a has been pushed sufficiently forward pawl 135 is forced downward by spring 146 so that pawl 135 is now aligned with a new tooth on rack 18a. As the lever bar is released or allowed to move upwardly, the primary pawl is drawn rearwardly allowing ratchet rack 18a to move rearwardly until it is arrested by secondary pawl 135. Pawl 139 continues to move rearwardly up over the next tooth on rack 18a and then being forced down in a new tooth by spring 146. In effect, the boom is drawn in by pawl 139 and held in by pawl 135.

In order to pull boom outwardly, control bar 147 is pushed to its downward position which in turn lifts spring 146, raising pawls 135 and 139 off the rack. The boom can then be pulled outwardly without interference from the pawls. By setting the control bar in the center position, spring 146 is neither biased up nor down but acts on pawls 135 and 139 in a forward and rearward fashion, allowing the above described ratchet action to occur in reverse. By this means, tension on the boom can be controllably released. The boom is, in effect, ratcheted out as a result of the outward pulling forces.

At this point, it should be noted that when lever bar 64 is not required, it is completely removable from the hitch. This is best shown in for example, FIGS. 1 through 3 of the drawings. As earlier described, the upper cap 56 includes the forward slot 61 which allows up and down movement of the lever for ratcheting purposes. FIGS. 10 and 11 show that the upper cap 56 also includes a rearward opening 61a and lever 64 includes a depression 64a near its rearward end which fits through opening 61a. The depression 64a seats in the cap lip immediately above opening 61a to hold the lever bar in its ratcheting position. However, by tilting the lever bar up sufficiently far to drop the end of the lever bar away from the cap lip, the lever bar can be pulled completely out of the cap as desired. This is well shown in FIG. 1 of the drawings with the hitch in the towing position where the lever is not required and removed from the hitch.

As earlier described, sleeve 31 is provided with a pair of catches 35 and hooks 27 are provided near the outer end of the boom. As also described, these hooks and catches do provide some support in holding the boom in, however, their primary function is to align the boom yoke holes 21 with center column opening 37 to ease the insertion of lock pin 39. This is best shown in FIGS. 21 through 23 of the drawings where FIG. 21 shows the boom being ratcheted inwardly but not yet fitted with the center column assembly. FIG. 22 shows that the hooks 27 on the boom yoke initially contact then ride up over catches 35 necessitating a slight amount of up and down play in the boom itself. FIG. 23 shows that once the boom has been completely drawn in, hooks 27 drop down into catches 35 and the hooks and catches are positioned to provide a very accurate location of the boom yoke holes with the center column opening. This ensures that the pin can be easily hand fitted into position. In addition, the hooks holding onto the catches eliminates much of the play that might otherwise normally occur between the boom and the boom sleeve which could possibly damage or sheer the pin.

Although various preferred embodiments of the invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A hand operated trailer hitch with a boom which is extendable from a drawn in position to different extended positions and which is swingable from a centered position to different sideways angled hook up positions independently of extendability of said boom, a ratchet assembly which pulls said boom inwardly from any of said different extended positions to said drawn in position, and stops provided in said hitch which prevent outward swinging movements of said boom while being pulled inwardly.

2. A trailer hitch comprising a hitch body to be affixed to a vehicle and a boom extendable relative to said hitch body from a drawn in position to different extended positions and which independently of extendability of said boom is movable in a swinging motion relative to said hitch body from a centered position to different hook up positions angled sideways from said centered position, a ratchet assembly which pulls said boom inwardly from any of said extended positions to said drawn in position and a ratchet arrangement for controlling the swinging motion said boom, said ratchet arrangement being movable between a ratchet released position to enable the swinging motion of said boom and a ratchet engaged position in which said boom is only pushable towards the centered position.

3. A trailer hitch as claimed in claim 2, including ratchet control means which prevents said ratchet arrangement from moving to the ratchet released position when said boom is being drawn inwardly.

4. A trailer hitch as claimed in claim 2, wherein said ratchet arrangement comprises a first ratchet collar secured to said hitch body and a second ratchet collar connected to said boom, each of said collars having stepped edges and said second collar being movable from a fully mated position relative to said first collar to different positions in which said first and second collars are not fully mated with one another as said boom swings away from the centered position.

5. A trailer hitch as claimed in claim 4, including a ratchet control having a first control position causing separation of said stepped edges of said ratchet collars for swinging said boom and a second control position holding said stepped edges of said ratchet collars against one another preventing outward swinging of said boom.

6. A trailer hitch as claimed in claim 5, including a spring normally biasing said ratchet control to said second control position.

7. A trailer hitch as claimed in claim 6, including a ratchet control lock which prevents movement of said ratchet control to said first control position while said boom is away from said drawn in position.

* * * * *